No. 775,978. Patented November 29, 1904.

UNITED STATES PATENT OFFICE.

MAX KERSCHBAUM, OF HOLZMINDEN, GERMANY, ASSIGNOR TO HAARMANN & REIMER, CHEMISCHE FABRIK ZU HOLZMINDEN, GESELLSCHAFT MIT BESCHRÄNKTER HAFTUNG, OF HOLZMINDEN, GERMANY, A CORPORATION OF GERMANY.

PROCESS OF MAKING SESQUITERPENE ALCOHOL.

SPECIFICATION forming part of Letters Patent No. 775,978, dated November 29, 1904.

Application filed February 16, 1903. Serial No. 143,706. (Specimen.)

*To all whom it may concern:*

Be it known that I, MAX KERSCHBAUM, a chemist and doctor of philosophy, and a subject of the King of Würtemberg, residing at Holzminden-on-the-Weser, Duchy of Brunswick, German Empire, have invented a certain new and useful Process for Manufacturing a New and Useful Sesquiterpene Alcohol, of which the following is a specification.

In the investigation of various essential oils—such as essential oil of cassie flowers, oil of ambrette seeds—I have discovered and liberated a new substance not obtained nor described heretofore of the nature of a sesquiterpene alcohol and by means of which I have obtained various novel industrial effects. This substance possesses a very pleasant, sweet, and persistent odor of fresh flowers; but this odor is not very pronounced in the essential oils, where I have detected its presence in sufficient quantities to render the extraction remunerative, inasmuch as the odor is concealed by other bodies having a stronger or entirely different odor, while in other essential oils of this kind the new sesquiterpene alcohol exists in form of only faintly-smelling chemical compounds or having an odor entirely different from that of the new product itself.

In view of researches made by me and by means of the process forming the subject of this invention I am enabled to produce the new substance in a pure state and to obtain the following novel industrial effects—that is to say, first, the advantage of being able to manufacture the special perfume of this product at a reduced cost and always of the same standard quality with mathematical exactness and on an industrial scale; second, I am enabled to produce by artificial means the mixtures and compositions of substances of which this sesquiterpene alcohol or any chemical combination of this substance are the essential constitutents—such as essential oil of cassie flowers, musk-seed oil, (oil of ambrette seeds,) and others. Thus as a result of the new means detected for separating and ascertaining the quality of the said alcohol I am also enabled to devise means for obtaining new scenting substances and to produce some of those which already exist in nature under industrially remunerative conditions.

The new product I describe in this specification is an alcohol of the so-called "sesquiterpene" series and has the formula $C_{15}H_{26}O$. It may be obtained from the essential oils in which it is contained in a free state by fractional distillation; but it is difficult to free it by this process quite perfectly from other substances in admixture with it. I have ascertained that the properties of the new product are those of a primary or secondary alcohol. In order to obtain it in a pure state and of pleasant odor, it has been found sufficient to act on the essential oils which contain the sesquiterpene alcohol with anhydrids of acids—such as phtalic-acid anhydrid, camphoric-acid anhydrid, benzoic-acid anhydrid, and the like—or I may preferably use the fractional distillates of these essential oils which are rich in this alcohol—that is to say, those fractions which by so-called "fractional" distillation have become enriched in sesquiterpene alcohol, such as the fractions boiling at a temperature from 150° to 200° centigrade at twenty millimeter pressure (or at a somewhat lower pressure in the case of essential oils of somewhat lower boiling-points.) The thus-obtained ether-like substances are purified according to any well-known process and are then saponified to free the alcohol.

In the case of natural products containing the sesquiterpene alcohol, not only in the free state, but in form of ether compounds capable of decomposition by alkali, it is preferable to subject the raw materials employed for the manufacture of the new product—for example, the oil of ambrette seeds—to a pre vious treatment with hydrate of alkalies or of the alkaline earths. The treatment with alkali has the double effect of first effecting a saponification and besides of producing the resinification of the impurities which cannot be separated from the alcohol by ordinary chemical methods or fractional distillation, &c. After the substances have been saponified as described and after submitting them to fractional distillation under reduced pressure those fractions which are rich in this alcohol are purified, as above described, by treatment with anhydrids of acids. By this previous saponification the further advantage is obtained of destroying certain odorous substances other than the sesquiterpene alcohol, thus contributing greatly to facilitate the purification of the latter. In the working of the process on an industrial scale I may even make use of the crude product obtained by fractional distillation of the previously-saponified substances and which is rich in the new product.

In certain cases it will be of advantage to repeat the treatment of the residue with acid anhydrid several times with a view of a substantially complete extraction of the sesquiterpene alcohol contained in the essential substance under treatment. A test made with the residue from the first treatment will show whether a second treatment is necessary.

Example: Oil of musk-seed (i. e., oil of ambrette seeds) is dissolved in dilute alcohol to which has been added a quantity of potassium or sodium hydrate corresponding to one and one-half times the percentage of ether in the substance, and the mixture is then heated in a suitable apparatus provided with a reflux condenser. The operation is finished when the peculiar odor of the essential oil has disappeared. I then distil off the alcohol (by means of steam, if required) and dilute the remaining mass with water and extract it by a suitable solvent like ether. I may also separate the product from the previously-saponified mass by carrying it over by distillation in steam.

The oil thus obtained by any of these processes constitutes a raw material which is purified either by first submitting it to fractional distillation in vacuo or by merely treating it after previous drying to the action of acid anhydrid, so as to convert it into ester-like combinations with the acids or into difficultly-volatile esters. These ester-like products are then purified by well-known processes and then decomposed by saponification, whereby the sesquiterpene alcohol is obtained in a pure state, while the acid is recovered. The action of the anhydrid preferably takes place at an elevated temperature; but it is understood that the duration of the treatment and the temperature at which the substances are treated are of course not to be strictly adhered to and are not conditional for the process. It may be stated that it is of advantage to agitate the mixture. I may, for instance, proceed in the following manner: One hundred parts of the crude product prepared as described above—that is to say, of the essential substance more or less enriched in sesquiterpene alcohol—are diluted in one hundred parts benzene, and to this I add sixty parts of phtalic-acid anhydrid and heat for several hours at 125° centigrade, then allow to cool and extract the mass by water with a slight addition of a solution of an alkaline carbonate, (carbonate of soda, for instance.) The alkaline liquid is then shaken several times, with a suitable solvent like ether, and finally submitted to the action of a steam current after having previously added an excess of alkali. The sesquiterpene alcohol which is carried over with the steam is separated and further purified by fractional distillation in vacuo, the fraction which distils over at about 155° to 165° centigrade (not corrected) at ten millimeters pressure constituting the purified product.

The new product is an almost colorless fragrant oil, soluble in benzin, alcohol, and ether, practically insoluble in water, corresponding to the formula $C_{15}H_{26}O$, boiling at approximately 160° under ten millimeters pressure, (not corrected.) It has a density of about 0.885 at 18° and a refracting index $n_D = 1.488$. By elementary analysis it is found to be an alcohol of the sesquiterpene series of the formula $C_{15}H_{26}O$. By oxidation with chromic and sulfuric acid it is transformed into an aldehyde whose semicarbazone crystallizes from tate of ethyl in white leaves, melting after previous softening at about 133° to 135° centigrade.

The new product possesses a very sweet and very persistent odor of flowers. It is capable by itself of various industrial applications as a scenting agent and also as a raw material in the manufacture of its derivates.

By means of my process it becomes a comparatively easy matter to determine the presence of this product in the various essential oils of nature wherein it exists and to separate it therefrom, if necessary, for purposes of manufacture.

What I claim, and desire to secure by Letters Patent of the United States, is—

As a new product a fragrant oil having the formula $C_{15}H_{26}O$, boiling at about 160° at ten millimeters pressure, of a density of about 0.885 at 18° centigrade, its index of refraction being 1.488, and having the characters of an alcohol, forming ether-like substances by union with acids like acetic acid, resisting decomposition by alkalies, which resinify the impurities and enable them to be removed, and being transformed by oxidation into an aldehyde whose semicarbazone forms white leaves melting after previous softening at about 133° to 135° centigrade.

In witness whereof I have hereunto signed my name in the presence of two subscribing witnesses.

MAX KERSCHBAUM.

Witnesses:
    JULIUS SECKEL,
    BERTHA REIMANN.